United States Patent
Li et al.

(10) Patent No.: US 11,526,843 B2
(45) Date of Patent: Dec. 13, 2022

(54) PRODUCT IDENTIFICATION SYSTEMS AND METHODS

(71) Applicant: PepsiCo, Inc., Purchase, NY (US)

(72) Inventors: Xuejun Li, Pleasantville, NY (US); Yong Jin Serock, Newtown, CT (US); Cheuk Chi Lau, White Plains, NY (US)

(73) Assignee: PepsiCo, Inc., Purchase, NY (US)

(*) Notice: Subject to any disclaimer, the term of this patent is extended or adjusted under 35 U.S.C. 154(b) by 81 days.

(21) Appl. No.: 16/864,676

(22) Filed: May 1, 2020

(65) Prior Publication Data
US 2021/0342770 A1 Nov. 4, 2021

(51) Int. Cl.
| | | |
|---|---|---|
| *G06Q 10/08* | (2012.01) | |
| *G06Q 30/00* | (2012.01) | |
| *G06Q 20/18* | (2012.01) | |
| *G06K 7/14* | (2006.01) | |
| *G06K 7/10* | (2006.01) | |
| *G01G 19/52* | (2006.01) | |
| *G01G 3/14* | (2006.01) | |
| *G01S 17/88* | (2006.01) | |
| *G07C 9/00* | (2020.01) | |
| *G06V 10/75* | (2022.01) | |
| *G06V 20/52* | (2022.01) | |

(52) U.S. Cl.
CPC ............ *G06Q 10/087* (2013.01); *G01G 3/14* (2013.01); *G01G 19/52* (2013.01); *G01S 17/88* (2013.01); *G06K 7/10722* (2013.01); *G06K 7/1413* (2013.01); *G06Q 20/18* (2013.01); *G06Q 30/0185* (2013.01); *G06V 10/751* (2022.01); *G06V 20/52* (2022.01); *G07C 9/00174* (2013.01)

(58) Field of Classification Search
None
See application file for complete search history.

(56) References Cited

U.S. PATENT DOCUMENTS

| | | | |
|---|---|---|---|
| 2008/0033596 A1* | 2/2008 | Fausak .................. | G07F 19/207 700/244 |
| 2010/0138037 A1* | 6/2010 | Adelberg ................ | G07F 9/001 700/241 |
| 2014/0316916 A1 | 10/2014 | Hay | |
| 2017/0301173 A1* | 10/2017 | Hindsgaul ................ | G07F 7/00 |
| 2018/0070753 A1* | 3/2018 | Eveloff .................. | H04W 4/025 |
| 2018/0333013 A1* | 11/2018 | Starkey .................. | G01S 17/88 |
| 2020/0125888 A1* | 4/2020 | Hacker ................ | G06K 9/6256 |

OTHER PUBLICATIONS

International Search Report and Written Opinion in International Application No. PCT/US2021/022915, dated Jun. 3, 2021 (11 pages).

* cited by examiner

*Primary Examiner* — Paul Danneman
(74) *Attorney, Agent, or Firm* — Sterne, Kessler, Goldstein & Fox P.L.L.C.

(57) ABSTRACT

A method for identifying a product removed from a cabinet includes detecting visual characteristics of the product removed from the cabinet by a camera within the cabinet. The method may include detecting an identifier on the product removed from the cabinet by an identifier sensor, and comparing the visual characteristics and the identifier to a database of product information. The product removed from the cabinet may be identified based on the comparison of the visual characteristics and the identifier to the database of product information.

19 Claims, 15 Drawing Sheets

PRODUCT IDENTIFICATION SYSTEMS AND METHODS

FIELD

Embodiments described herein generally relate to systems and methods for identifying products. Specifically, embodiments described herein relate to systems and methods for identifying products removed from an unattended vending machine by a consumer.

BACKGROUND

Vending machines generally require a consumer to enter a payment, make a product selection, and wait for the product to be dispensed by the vending machine. However, the consumer can encounter multiple problems when using a vending machine. First, the vending machine may not accept the consumer's form of payment. For example, the vending machine may not accept paper bills that are creased or wrinkled. The vending machine may not properly register receipt of bills or coins, and thus the consumer may not receive credit for entered payment. The vending machine may not be configured to accept mobile payment which can be inconvenient for the consumer. Further, the vending machine may fail to read a payment card, such as a credit card or debit card. As a result, the consumer may be unable to make a purchase, or the consumer may become frustrated and decide to not use the vending machine.

Second, once payment is entered, the consumer may incorrectly enter the code corresponding to the desired product. As a result, a different product may be dispensed than the consumer anticipated. The consumer may be unable to return the incorrect product, and the consumer may have no recourse. Further, vending machines generally allow a consumer to purchase only a single product at a time, requiring the consumer to repeat the process of entering payment and selecting a product in order to purchase multiple products. Repeating the same steps can be time consuming and frustrating, and may deter the consumer from making multiple purchases.

Third, the vending machine may fail to properly convey the selected product to the user. For example, a screw drive may fail to move the product to the dispensing opening of the vending machine, or a gate holding the product in place may not fully open. Additionally, the product may become stuck or lodged within the vending machine and may not be accessible by the consumer. As a result, the consumer may not receive the product and cannot obtain a refund of their payment.

Vending machines have various additional drawbacks such as the inability for the consumer to personally select a specific product. Instead, the consumer simply selects the type of product, but cannot pick the exact product to be dispensed. Further, the consumer cannot handle or inspect the product before purchasing. As a result, the consumer may not be able to learn about the product, such as to read the label, ingredients, or nutritional information. This may discourage the consumer from purchasing products that are not familiar. The dispensed product may be damaged, expired, or otherwise deficient. These various factors can contribute to a poor consumer experience.

Thus, improved vending machines are desired that provide a simple and easy purchasing experience. Further, vending machines are desired that allow a consumer to personally select one or more products and that ensure dispensing of the desired product.

BRIEF SUMMARY OF THE INVENTION

Some embodiments described herein relate to a method for identifying a product removed from a cabinet, the method including detecting visual characteristics of the product removed from the cabinet by a camera within the cabinet, detecting an identifier on the product removed from the cabinet by an identifier sensor, comparing the visual characteristics and the identifier to a database of product information, and identifying the product removed from the cabinet based on the comparison of the visual characteristics and the identifier to the database of product information.

Some embodiments described herein relate to a method for identifying a product removed from a cabinet, the method including capturing a first image of a plurality of products within the cabinet by an internal camera within the cabinet, removing a product of the plurality of products from the cabinet, capturing a second image of the plurality of products within the cabinet by the internal camera after removing the product, determining an identity of the product removed from the cabinet by analyzing the first image and the second image, and confirming the identity of the product removed from the cabinet by detecting an identifier of the product removed from the cabinet.

Some embodiments described herein relate to a method for identifying products removed from a cabinet, the method including detecting a location from which the product was removed from the cabinet via at least one of a camera and a sensor, determining a visual characteristic of the product based on data from the at least one of a camera and a sensor, determining a predicted identity of the product based on the visual characteristic, determining an identity of the product at the location based on a digital map of products within the cabinet, and confirming that the predicted identity of the product corresponds to the identity of the product based on the digital map.

In any of the various embodiments discussed herein, the visual characteristics may include a shape of the product.

In any of the various embodiments discussed herein, the visual characteristics may include a coloring of the product.

In any of the various embodiments discussed herein, the identifier sensor may be the camera.

In any of the various embodiments discussed herein, the identifier may be a barcode.

In any of the various embodiments discussed herein, the method may further include confirming the identity of the product by determining a weight of the product removed from the cabinet with a weight sensor arranged within the cabinet. In some embodiments, determining the weight of the product removed from the cabinet may include determining a first weight of products in the cabinet via the weight sensor, determining a second weight of products in the cabinet via the weight sensor after removing the product from the cabinet, and calculating a difference between the first weight and the second weight.

In any of the various embodiments discussed herein, the method may further include detecting a visual characteristic of the product removed from the cabinet at a location outside of the cabinet by an external camera, and confirming the identity of the product removed based on the visual characteristic detected by the external camera.

In any of the various embodiments discussed herein, the method may further include detecting a user by an external camera, detecting by the external camera unauthorized conduct by the user, and locking the cabinet when the unauthorized conduct is detected.

In any of the various embodiments discussed herein, the method may further include detecting data relating to the product removed via an optical sensor, and confirming the identity of the product removed using the data from the optical sensor.

In any of the various embodiments discussed herein, the optical sensor may include a LIDAR sensor.

In any of the various embodiments discussed herein, the method may further include updating the digital map of products within the cabinet after the product is removed from the cabinet.

In any of the various embodiments discussed herein, the method may further include generating the digital map of the products within the cabinet using data received from the at least one of a camera and a sensor.

In any of the various embodiments discussed herein, the digital map may include a location and a model of each product within the cabinet.

In any of the various embodiments discussed herein, the method may further include detecting an identifier of the product removed from the cabinet via an identifier sensor.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
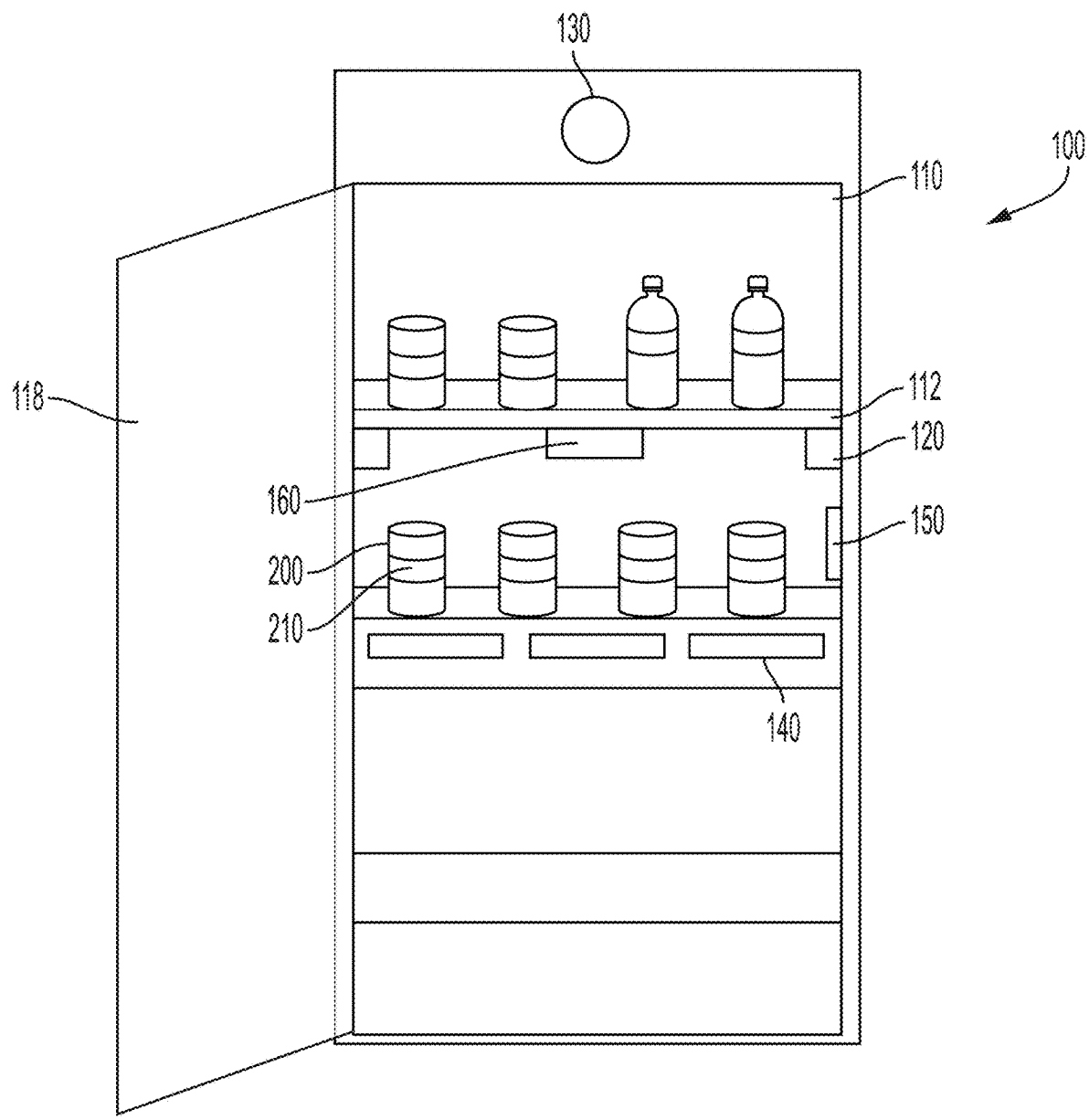
FIG. 1 shows a front view of a vending machine configured to identify products removed from the cabinet according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Some vending machines may provide consumers with access to the compartment in which the products are stored. In this way, the consumer can inspect the products to review the label, nutritional information and the like when deciding whether to purchase the product. Further, the consumer can select the exact product desired to be purchased. The consumer may readily purchase multiple products in a single transaction.

Such vending machines may accept a payment source from a consumer or identify the consumer, provide the consumer with access to the cabinet in which the products are stored, detect the products removed from the cabinet by the consumer, and charge the consumer for the selected products. While such vending machines may provide added convenience to the consumer, accurately detecting products selected by the consumer presents numerous technical challenges. If products removed from the cabinet are not identified and charged to the consumer, the owner of the vending machine may lose income. Additionally, if products removed are not correctly identified, the consumer may be charged the wrong price, and the inventory of the vending machine may be incorrectly maintained. Considerations must also be made to ensure that consumers do not tamper with products or otherwise engage in unauthorized activities.

In order to ensure accurate identification of products removed from the vending machine, the vending machine must be able to differentiate between a variety of products, many of which may be similar in appearance. For example, many beverage bottles may be the same or similar in size and shape, particularly beverages from the same manufacturer. Thus, some products may differ only by small details on the packaging, such as the product name or coloring.

The vending machine must also be able to detect the product in various orientations. The products may be arranged in the cabinet with various orientations, and consumers may remove products from the vending machine in different manners. Consumers may select products in ways that obscure the product, inhibiting identification. For example, a consumer may grab multiple products in one hand, making it difficult to detect each individual product selected. Consumers may also remove a product and return the product to a different location and in a different orientation than the product was initially positioned.

In order to ensure proper use of the vending machine, precautions must be taken to prevent unauthorized conduct, such as stealing or tampering with products, or damaging the vending machine. A consumer may try to remove products without detection so that the product will not be charged to the consumer. Alternatively, a consumer may try to deceive the vending machine by inserting external objects into the vending machine in place of products to make it appear that a product has been returned. If consumers are able to steal or tamper with products, the owner of the vending machine may suffer loss of income. Other consumers may not choose to use the vending machine if the products available for purchase are damaged.

Some embodiments described herein relate to systems and methods for identifying products removed from a cabinet using a camera and an identifier sensor in which data collected by the camera and identifier sensor are compared to a database of product information. In this way, a product can be accurately identified without the consumer having to manually scan or enter information about a product, simplifying purchase of products from the vending machine. Some embodiments described herein relate to systems and methods for identifying a product removed from a cabinet that includes generating a digital map of products within the cabinet. The digital map provides a baseline of the location and identity of products within the cabinet and may be used to confirm identification of a product removed from the cabinet by cameras or sensors in the cabinet.

In some embodiments, a vending machine 100 may include a cabinet 110 having a plurality of products 200 stored within cabinet 110, as shown in FIG. 1. Cabinet 110 may further include a door 118 that can be opened to provide access to the plurality of products 200 within cabinet 110. Cabinet 110 may include one or more cameras 120, 130 or sensors 140, 150, 160 for identifying products. Specifically, cameras and sensors are configured to identify products removed from cabinet 110 so that the consumer is charged only for products removed from cabinet 110 and not returned to cabinet 110. Data collected by the sensors and cameras is analyzed, such as by a control unit 180 (see FIG. 2), to determine the identity of the product removed. The analysis may include a comparison of the data from the cameras and sensors to a database of product information and/or a product inventory.

The detection system and methods described herein may be used in a vending machine that allows a user to manually select and remove products from a cabinet in which the products are stored. A vending machine that allows a consumer to manually select and remove products is described for example in U.S. application Ser. No. 16/559,300, filed Sep. 3, 2019, incorporated herein by reference in its entirety. An exemplary vending machine incorporating a product identification system and method is described herein for illustrative purposes only. One of ordinary skill in the art will appreciate that the product identification system and methods described herein can be used with other types of vending machines or merchandisers, and can be utilized in other environments for product identification.

Figure 2:
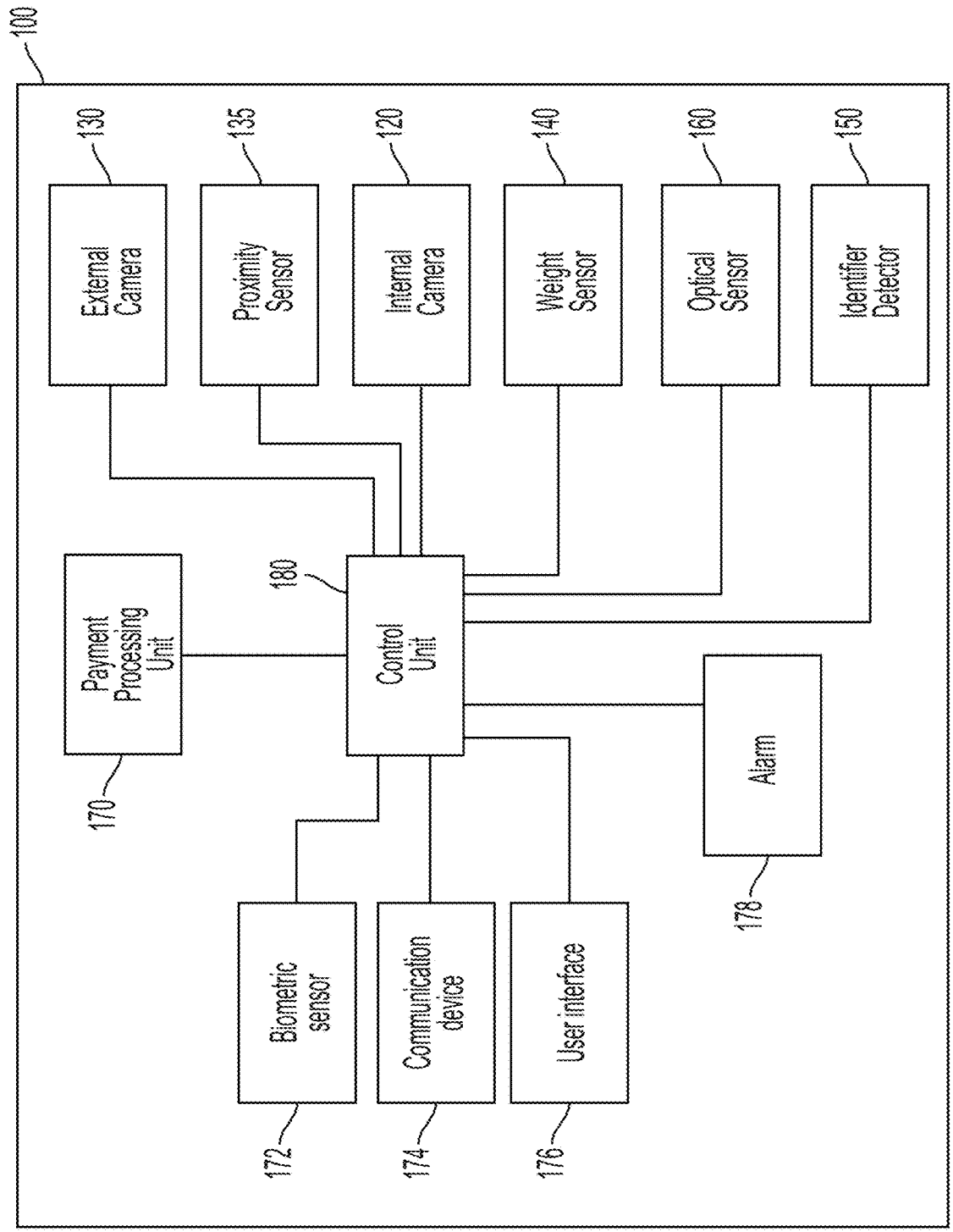
FIG. 2 shows a schematic diagram of components of a system for identifying a product removed from a cabinet of a vending machine according to an embodiment.

A vending machine 100 may have components as shown for example in FIG. 2. However, vending machine 100 need not have each and every component shown in FIG. 2, and may include additional components.

Vending machine 100 may be configured to authenticate a consumer's identity. Vending machine 100 may include an external camera 130 to identify a consumer by facial recognition, or a biometric sensor 172 to obtain biometric information from the consumer, such as a thumbprint or iris. In some embodiments, vending machine 100 may alternatively or additionally include a communication device 174, such as a wireless transceiver, for communicating with a mobile device, such as a cell phone, so that the consumer may authenticate or provide payment via a mobile device. In such embodiments, the mobile device may have a software application to facilitate interaction with vending machine 100. The consumer's identity may be linked with a consumer profile that includes information about the consumer, such as a payment source, so that the consumer need not manually enter a payment when using vending machine 100, and the consumer's purchase can be automatically credited to the consumer's profile.

Vending machine 100 may not require authentication of a consumer and may simply accept a form of payment from the consumer. Vending machine 100 may include a payment processing unit 170 that may include one or more slots to receive paper money, coins, or tokens. Payment processing unit 170 may include a card reader to read a magnetic stripe or an electronic chip of a credit card, debit card, gift card, or the like, or that includes a near field communication (NFC) antenna to receive contactless payment from a contactless payment card. Payment processing unit 170 may include a communication device to accept mobile payments or cryptocurrency from a mobile electronic device, such as a cell phone, watch, laptop, tablet, or the like, or payment processing unit 170 may include a scanner to scan a payment code, such as a quick response (QR) code.

Upon authenticating a consumer's identity or receiving a payment from the consumer, door 118 of vending machine 100 may be automatically unlocked so that the consumer may access the plurality of products 200. The products removed by the consumer may be identified by methods as described herein. A virtual shopping cart displayed on a user interface 176 or on the user's mobile device may list the products removed from cabinet 110 along with the price of the products, and a total price of the products.

Purchase of the removed products may be completed when the consumer closes door 118 of vending machine 100. To complete the purchase, the consumer may provide an input, such as making a selection to complete the transaction on a user interface 176 of vending machine 100, or performing a gesture on a user interface 176 having a touch screen, such as swiping along a path. Alternatively, the purchase may be completed automatically when door 118 is closed for a predetermined period of time.

Figure 3:
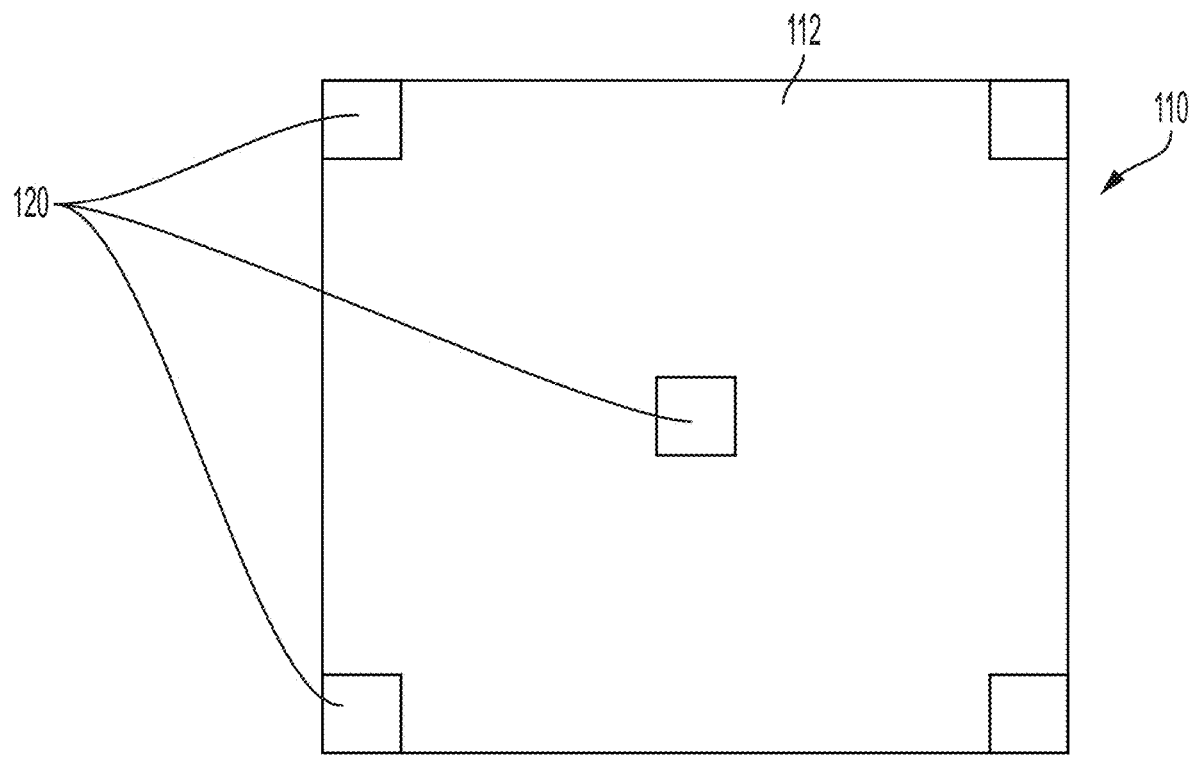
FIG. 3 shows a top-down view of a shelf of a vending machine showing an arrangement of cameras according to an embodiment.

In some embodiments, vending machine 100 may include one or more internal cameras 120 within cabinet 110 for identifying products, as shown in FIG. 3. Cameras 120 may be configured to capture static images, cameras 120 may capture videos, or both. In some embodiments, a plurality of cameras 120 may be arranged to capture images or videos of products on each shelf 112 of cabinet 110. A camera 120 may be arranged at one or more corners of cabinet 110 above each shelf 112. Further, in some embodiments, a camera 120 may be arranged centrally above each shelf 112 so as to capture an image of a central portion of shelf 112. For example, a camera 120 may be arranged in each of four corners of cabinet 110 and a fifth camera may be arranged above a central portion of shelf 112. In this way, the cameras 120 may capture products from different angles and can detect products that may be obscured in a view from a particular camera 120. Further, cameras 120 can view any products within cabinet 110, and may have overlapping fields of view. For example, a camera 120 arranged at a front portion 116 of cabinet 110 may not fully capture a product arranged at a back portion 114 of cabinet 110. A best image from cameras 120 may be selected for analysis to determine the identity of the product, or a composite image incorporating various images may be generated and analyzed.

Figure 4:
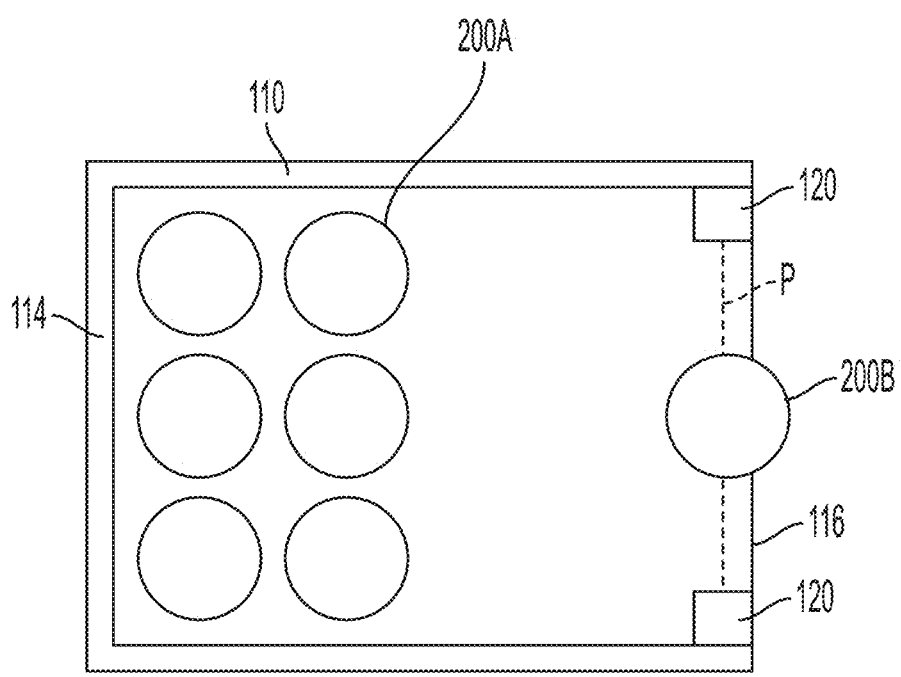
FIG. 4 shows a top-down view of a shelf of a vending machine showing the location of cameras according to an embodiment.

In some embodiments, one or more cameras 120 may be configured to capture images or video of a product exiting (or entering) the cabinet 110, as shown in FIG. 4. Cameras 120 may be arranged at front portion 116 of cabinet 110. In some embodiments, cameras 120 may be positioned at corners of front portion 116 of cabinet 110 or may be positioned about a perimeter of front portion 116 of cabinet 110. Cameras 120 may define a plane P that is parallel to a front portion 116 of cabinet 110. In this way, a product 200B exiting or entering the cabinet 110 must pass through plane P and is thus detected by cameras 120. In such embodiments, products 200A within cabinet 110 may not be detected by cameras 120. Cameras 120 may capture an image or video to identify product 200B removed from cabinet 110 or returned to cabinet 110. Cameras 120 at front portion 116 of cabinet 110 may have a clear view of a product 200 as it is being removed by the consumer as the product 200 is not obscured by other products within the cabinet.

Cameras 120 may be used to detect a visual characteristic of a product. The visual characteristic may include a shape of the product, a dimension of the product, a coloring of the product, or a combination thereof. Cameras may also be used to determine a location of a product within cabinet 110.

The shape of the product may be a silhouette or 2-D view of the product, such as a front profile, a side profile, a rear profile, a top-down view, or a bottom-up view. For example, if the product is a can, the shape may be a circular shape when viewed in a top-down manner, or a generally rectangular shape when viewed in a side profile. In some embodiments, shape may be a 3-D view, such as a perspective view of the product. The 3-D view may be generated by combining the 2-D views from various cameras. In some embodiments, cameras may be used to generate a model of each product. The model may be a 2-D model that includes a shape and color or color palette. In some embodiments, the model may be a 3-D model that includes the product's shape, dimensions, and a color or color palette. Cameras 120 may have depth sensors to aid in generation of the 3-D model. The cameras may determine the dimensions of the product so that products with similar shapes may be distinguished. For example, a 12 oz. can and a 16 oz. can are distinguishable despite both being cylindrical. In some embodiments, in order to ensure accuracy, cameras may be configured to determine the dimensions of products within ±5 mm, ±3 mm, or ±1 mm The visual characteristic may include a coloring of the product. The coloring may be a color of any portion of the product, or a pattern or combination of colors, e.g., a color palette. For example, the visual characteristic may be the color of the packaging, the color of text, logos or markings on the packaging, among other colored items. For example, when the product is a bottled beverage, the coloring may be a color of the bottle (e.g., clear, green), a color of the liquid within the bottle, a color of the bottle cap, a color of the label, or a color of the writing or markings on the label, and combinations thereof.

In some embodiments, an identifier sensor 150 (see, e.g., FIG. 1) may detect an identifier 210 of a product 200. An identifier 210 of a product may include a label, barcode, QR code, text (such as a brand, product, or flavor name), logo, or other markings on the product. In some embodiments, the identifier sensor may be a camera 120. In some embodiments, identifier sensor 150 may be a separate component, such as a scanner for scanning a barcode or QR code. Identifier sensor 150 may have sufficiently high resolution so that text on a product 200 can be read. In some embodiments, a control unit 180 of vending machine 100 may perform optical character recognition (OCR) to identify text in a captured image of a product. Captured images or video may have sufficient pixel density to allow for accurate identification of the text. In some embodiments, a minimum pixel density for identifying text may be about 2 pixels/mm. Further, identifier sensor 150 may have a high frame rate to provide sharp images to facilitate OCR.

In some embodiments, a convolutional neural network (CNN) may be used to detect an identifier 210 on a product 200 as will be appreciated by one skilled in the art, such that the identifier 210 may be analyzed for product recognition. CNN may be trained based on products available in vending machine 100 to increase accuracy. Further, identifier sensor 150 may have sufficient resolution to resolve differences in identifiers 210 of related products (e.g., Pepsi, diet Pepsi, cherry Pepsi). In some embodiments, for example, accurate identification of products may require a minimum pixel density of 1.5 pixels/mm.

Identifier sensor 150 may assist in determination of the specific stock keeping unit (SKU). For example, one or more cameras 120 may detect a size and shape of a product, but multiple products in cabinet 110 may be the same size and shape. Thus, identifier sensor 150 may help to determine the specific type of product by detecting an identifier 210 of the product. Alternatively, if the cameras 120 alone are able to determine an identity of the removed product, the information provided by identifier sensor 150 may be used to increase confidence that the product has been correctly identified or to confirm that identification of the product based on the cameras 120 is correct.

A control unit 180 may be configured to receive and analyze data from the cameras 120 and identifier sensor 150 to determine a product identity. Control unit 180 may also store a database of product information. The database may include information about the products stored in cabinet 110. The database may include for example a list of products. For each product, the database may include corresponding visual characteristics, such as a shape or silhouette, dimensions, and coloring of the packaging, product weight, and further information about a product label and identifiers. To identify a product removed from the cabinet, the analysis may determine a product in the database that has visual characteristics that correspond to, or best match, the visual characteristics determined based on data from cameras 120 and sensor 150. In some embodiments, control unit 180 may execute sensor fusion algorithms for determining product identity based on data from cameras 120 and sensors 150. Artificial intelligence and machine learning may be used to analyze the data from cameras 120 and sensors in combination with the database of product information to determine a product identity. In some embodiments, artificial intelligence may assign a confidence level to the product identification. Computer vision technology may be used to analyze data, such as images or video from cameras and sensors as will be understood by one of ordinary skill in the art. In some embodiments, artificial intelligence or computer vision technology may be employed remotely from vending machine 100. For example, cloud computing, edge computing, or a combination thereof may be used to analyze data from cameras 120 and sensors.

In some embodiments, control unit 180 may also store a product inventory of vending machine 100 so that it is known what products are in cabinet 110. Thus, the identification of products removed is limited to products known to be in cabinet 110, or on a particular shelf 112 from which the product 200 was removed. In some embodiments, control unit 180 may generate and store a digital map of products in cabinet 110 which may further aid in product identification, as discussed in further detail below with respect to FIG. 12.

Figure 5:
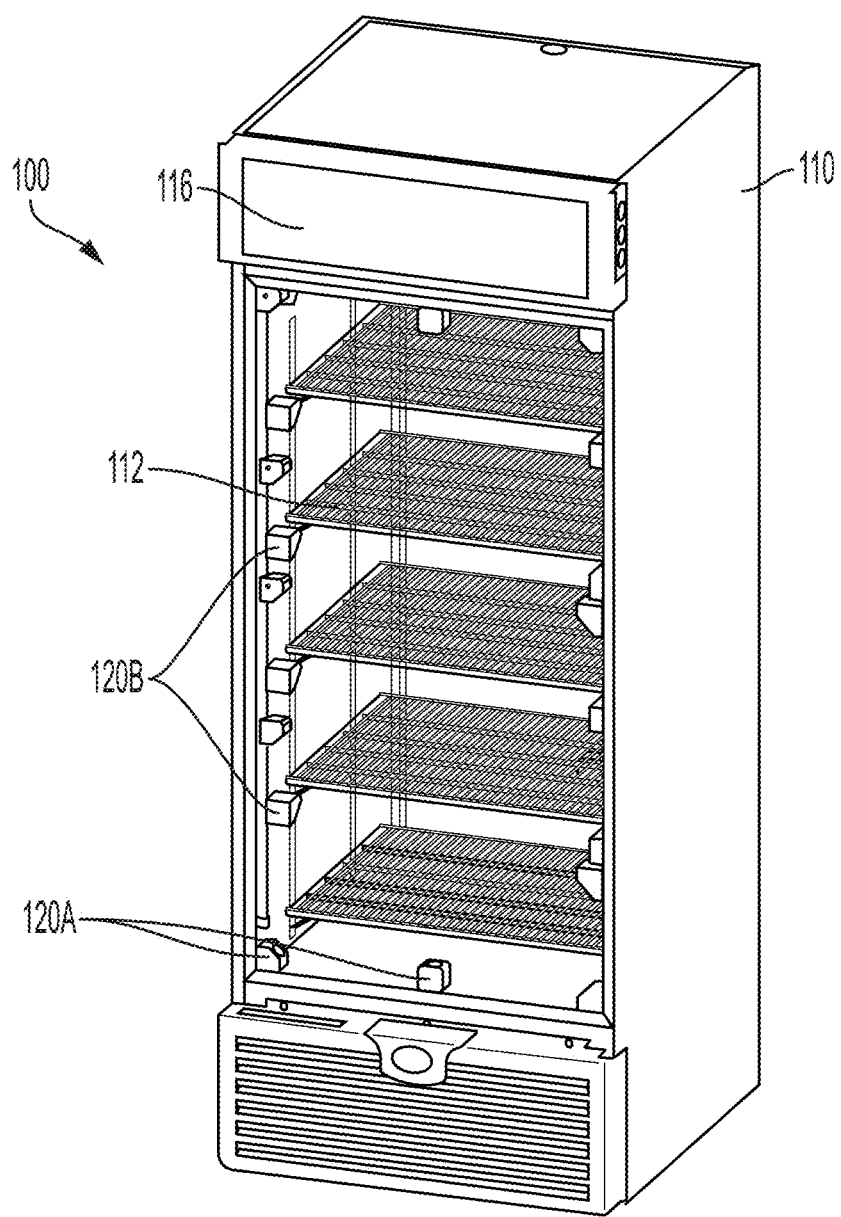
FIG. 5 shows a perspective view of a vending machine having cameras according to an embodiment.

In some embodiments, a vending machine 100 may include internal cameras 120, as shown in FIG. 5. Vending machine 100 includes a cabinet 110 having shelves 112 on which products may be stored. A first plurality of cameras 120B may be positioned above each shelf 112 so as to detect products on each shelf 112 inside of the cabinet 110. First plurality of cameras 120B may include cameras 120B at corners of each shelf 112 and at a central portion of each shelf 112. A second plurality of cameras 120A may be arranged at front portion 116 of cabinet 110. Second plurality of cameras 120A may be configured to detect a product removed from or returned to cabinet 110, as described above with respect to FIG. 4. The second plurality of cameras 120A may be positioned about a perimeter of front portion 116. However, in some embodiments, fewer or additional cameras 120 may be included.

Figure 6:
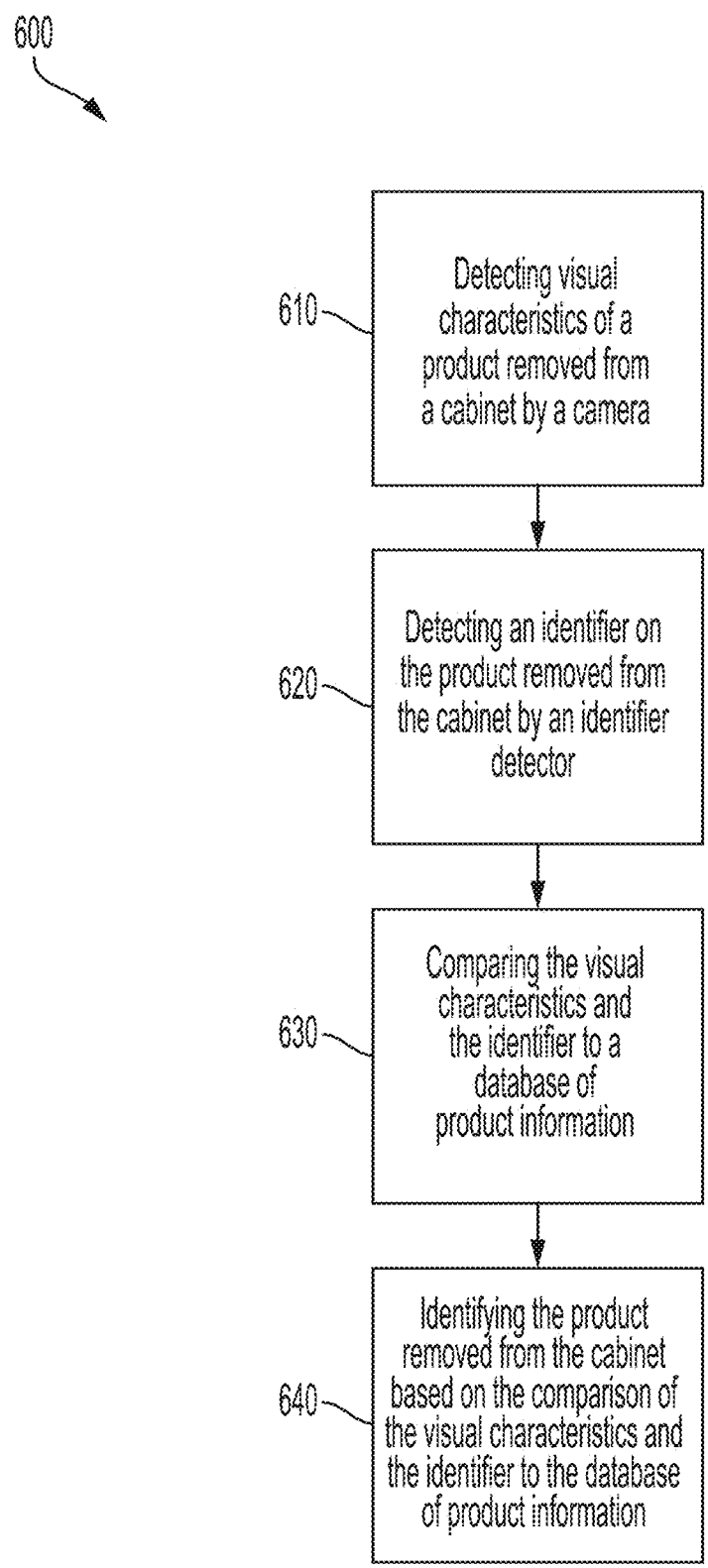
FIG. 6 shows an exemplary method of determining an identity of a product according to an embodiment.

In some embodiments, a method of determining an identity of a product removed from a cabinet may include using a camera to capture a video of products entering or exiting cabinet 600, as shown for example in FIG. 6. Cameras may be activated when the door of the cabinet is opened and may deactivate when the door is closed so that video is captured only when the cabinet is being accessed by a consumer. Camera 610 may detect a visual characteristic of a product removed from the cabinet. An identifier of the product removed from the cabinet may be detected by an identifier sensor 620. The visual characteristic and identifier may be analyzed to determine a product identity, which may be based on a database of product information 630. In some embodiments, the visual characteristic and identifier may be analyzed for correspondence with a product inventory or digital map of products in the cabinet. The identity of the product may be determined based on the analysis of the visual characteristic and identifier and the database of product information 640. In some embodiments, the visual characteristic or identifier alone may be used to identify the product, and the other of the visual characteristic or identifier may be used to confirm the identity of the product.

Figure 7:
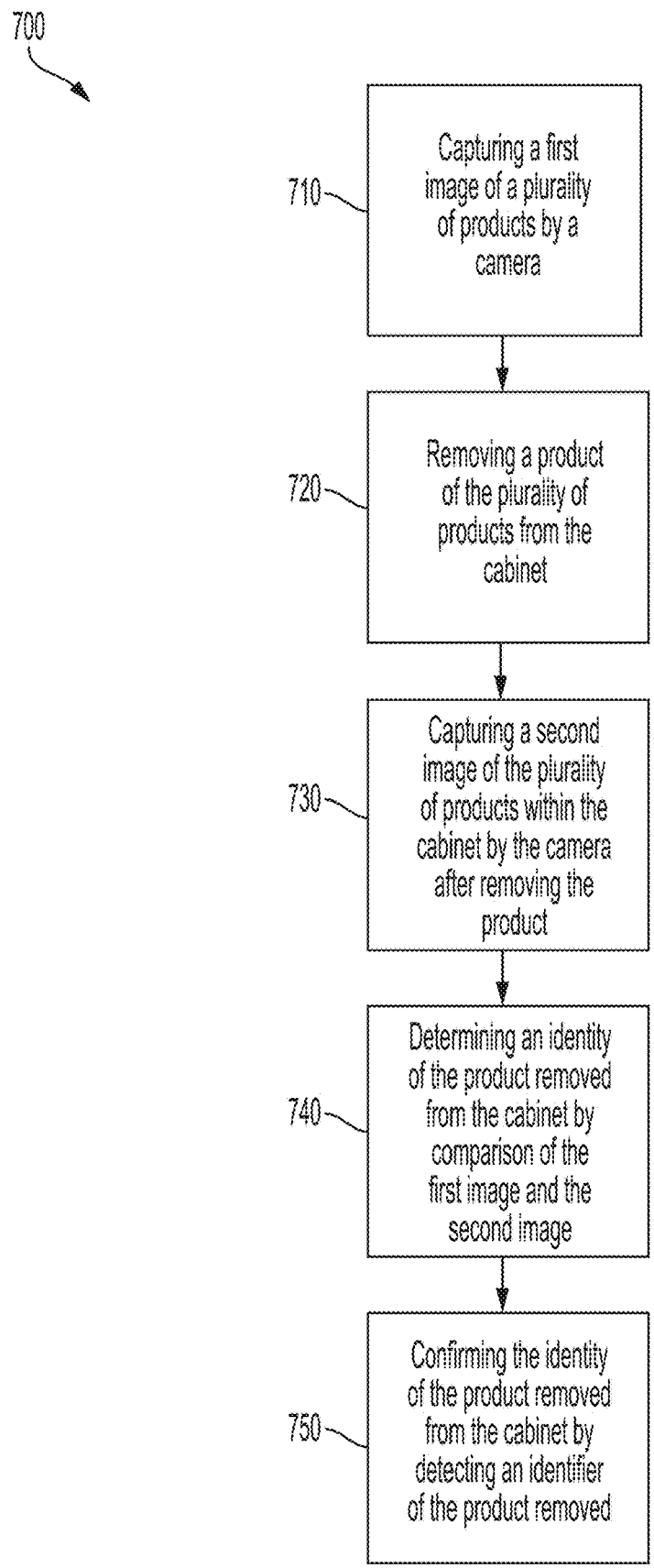
FIG. 7 shows an exemplary method of determining an identity of a product according to an embodiment.

In some embodiments, a method of determining an identity of a product 700 may include the use of cameras, as shown in FIG. 7. The cameras may capture images at a set interval or cameras may capture an image when the door of the cabinet is closed. When multiple cameras are used, the images from the multiple cameras may be combined into a composite image, or the best image may be used. The method may include capturing a first image of the plurality of products in the cabinet 710. The first image may be the baseline image showing the products before a consumer accesses the cabinet. A consumer may remove one or more products from the cabinet 720. The camera may then capture a second image of the plurality of products within the cabinet 730. The identity of the product may be determined in part by analyzing the first and second images to determine what products have been removed 740. The analysis of the images may be used to determine a visual characteristic of the product removed, and/or a location from which the product was removed. The analysis may include comparison of the visual characteristic to a database of product information, and the product location may be used to determine a product known to be stored at that location. Further, to confirm the identity of the product removed, an identifier of the product removed may be detected by an identifier sensor 750. By detecting an identifier of the product, the accuracy of the product identification may be increased relative to using data from the cameras alone.

In some embodiments, a combination of images and videos captured by cameras may be used to identify a product. In such embodiments, a camera may capture an image of products within the cabinet. Another camera may capture a video of a product being removed from cabinet. A second image may be captured of the products in the cabinet after the products have been removed. The video may be analyzed to determine a visual characteristic of the product, and artificial intelligence may use the visual characteristic and a database of product information to determine the identity of the product. The identity of the product as determined based on the captured video may be confirmed by an analysis of the first and second images to determine a location or visual characteristic of the removed product. Alternatively, the product identification may be made by analyzing the first and second images, and the data from the video may be used to confirm the identification.

In some embodiments, the identification of the product may be determined in part using a weight sensor 140 (see, e.g., FIG. 1). Weight sensor 140 may be configured to determine a weight of products in cabinet 110. In some embodiments, weight sensor 140 may be one or more load cells. Weight sensor 140 may be located on a shelf 112, or inside of a shelf 112, such that weight sensors 140 may determine a weight of a product placed on the shelf 112.

Figure 8:
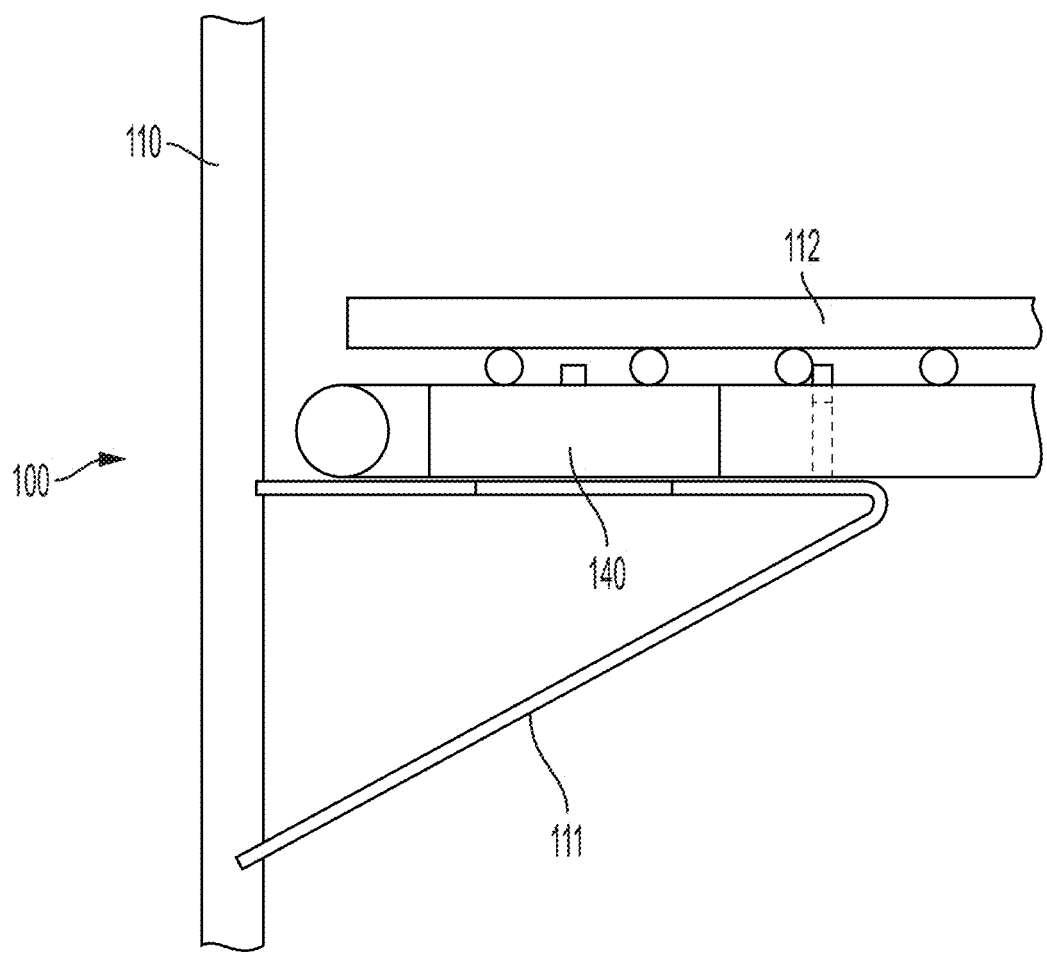
FIG. 8 shows a side view of a vending machine having a weight sensor according to an embodiment.

In some embodiments, weight sensor 140 may be arranged as shown in FIG. 8. Each shelf 112 within cabinet 110 of vending machine 100 may be supported on one or more weight sensors 140. In some embodiments, a weight sensor 140 is arranged at each corner of a rectangular shelf 112. Weight sensors 140 may be arranged on brackets 111 within cabinet 110. Thus, weight sensors 140 can detect the weight of shelf 112 and the products thereon to determine whether products have been removed from or returned to a shelf 112.

Figure 9:
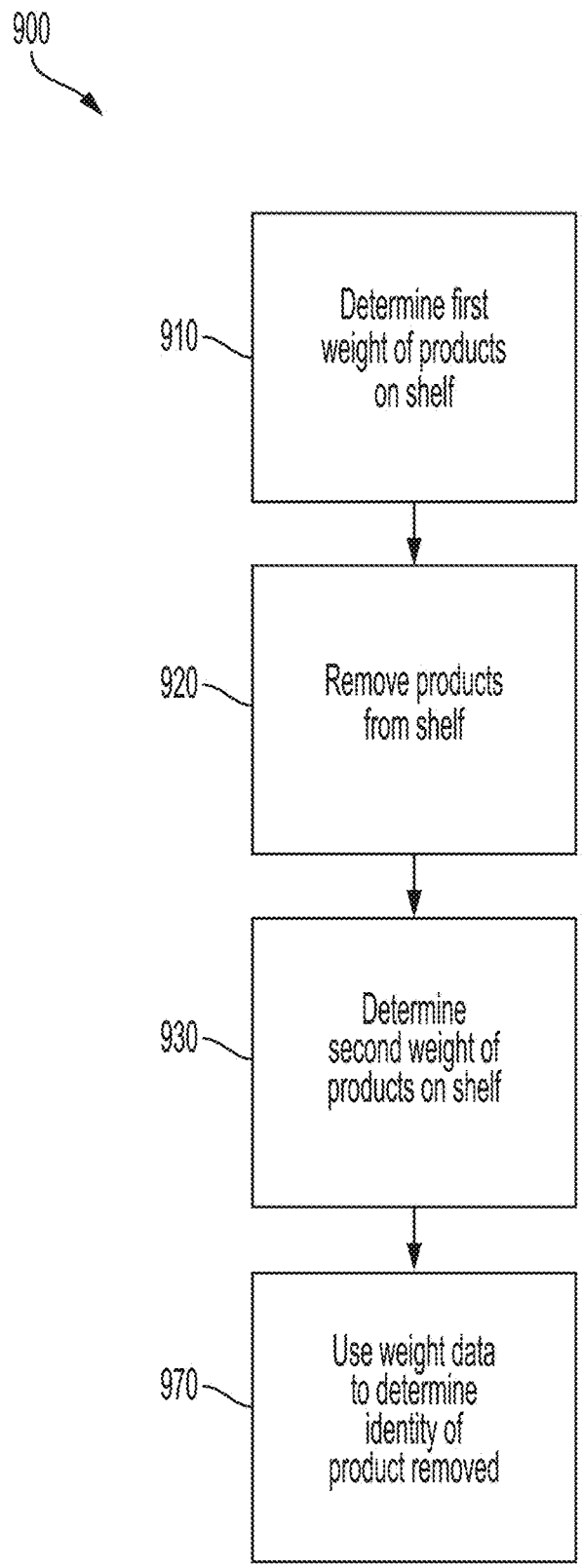
FIG. 9 shows an exemplary method of determining an identity of a product according to an embodiment.

An exemplary method of determining an identity of a product 900 using a weight sensor is shown in FIG. 9. A first weight of products on a shelf may be determined by a weight sensor 910. Products may be removed from the shelf by a consumer 920. A second weight of products on the shelf may be determined by the weight sensor 930. The difference between the first weight and the second weight may be calculated to determine the weight of the product or products removed. The calculated weight may be analyzed to determine a product or products in the database of product information that correspond to, or best match, the calculated weight of the product removed. The weight of the product removed can be used to confirm the identity of the product removed that was determined based on the cameras or identifier sensor.

In some embodiments, weight sensor 140 may also be used to provide information about the location of products in cabinet 110. A shelf 112 in cabinet 110 may include multiple weight sensors 140. Thus, weight sensors 140 may help to indicate the location from which the product is removed depending on which weight sensor 140 the product is placed. The more weight sensors 140 included in cabinet 110, the greater the ability of weight sensors 140 to determine the precise location of a product. Further, if the consumer returns a product, weight sensor 140 may help to determine the location at which the returned product is placed. This information may be used to update a digital map of products within cabinet 110. Weight sensor 140 may also detect a product that has fallen over or that is obscured by other products and may not be readily viewed by cameras 120.

Figure 10:
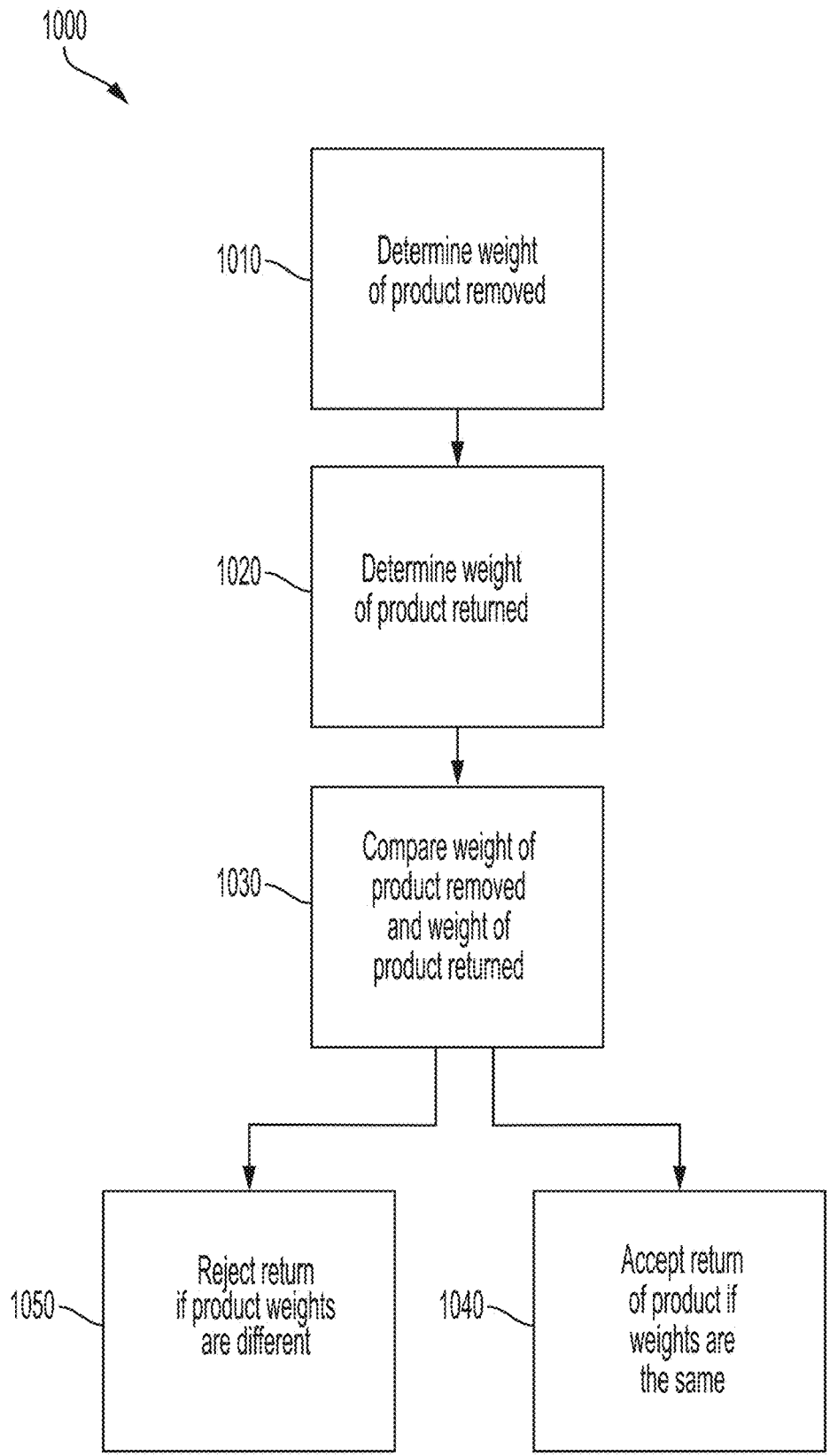
FIG. 10 shows an exemplary method of determining whether a product has been returned to the cabinet according to an embodiment.

In some embodiments, a weight sensor may be used to determine unauthorized conduct by the consumer, as shown in FIG. 10. In such embodiments, a weight of a product removed may be determined by a weight sensor 1010, as discussed above with respect to FIGS. 8-9. Weight sensor may also determine the weight of a product returned to the cabinet 1020. For example, a consumer may take out a product to read the label or nutritional information and may decide against purchasing the product and return the product to the cabinet. The weight of the product removed is compared to the weight of the product returned 1030. If the weight of the product returned is the same as the weight of the product removed, the return is accepted 1040. If the weight of the product returned is different from the weight of the product returned, the return is not accepted 1050. Thus, the consumer may be charged for any products removed and not returned. If the consumer attempts to deceive the system by returning an external item in place of the product removed from the cabinet, the system can detect that the weight of the external product differs from the weight of the product removed. Further, if the consumer samples the product, such as by consuming a portion of the product, the weight of the product will decrease, and the return will not be accepted.

In some embodiments, the determination of whether a product is properly returned can be aided by cameras 120. Cameras 120 may detect a visual characteristic of the product removed and of the product returned to determine if the visual characteristic is the same. If the visual characteristic of the product returned differs from the visual characteristic of the product removed, the consumer may have tampered with the product or attempted to return a different item.

Figure 11:
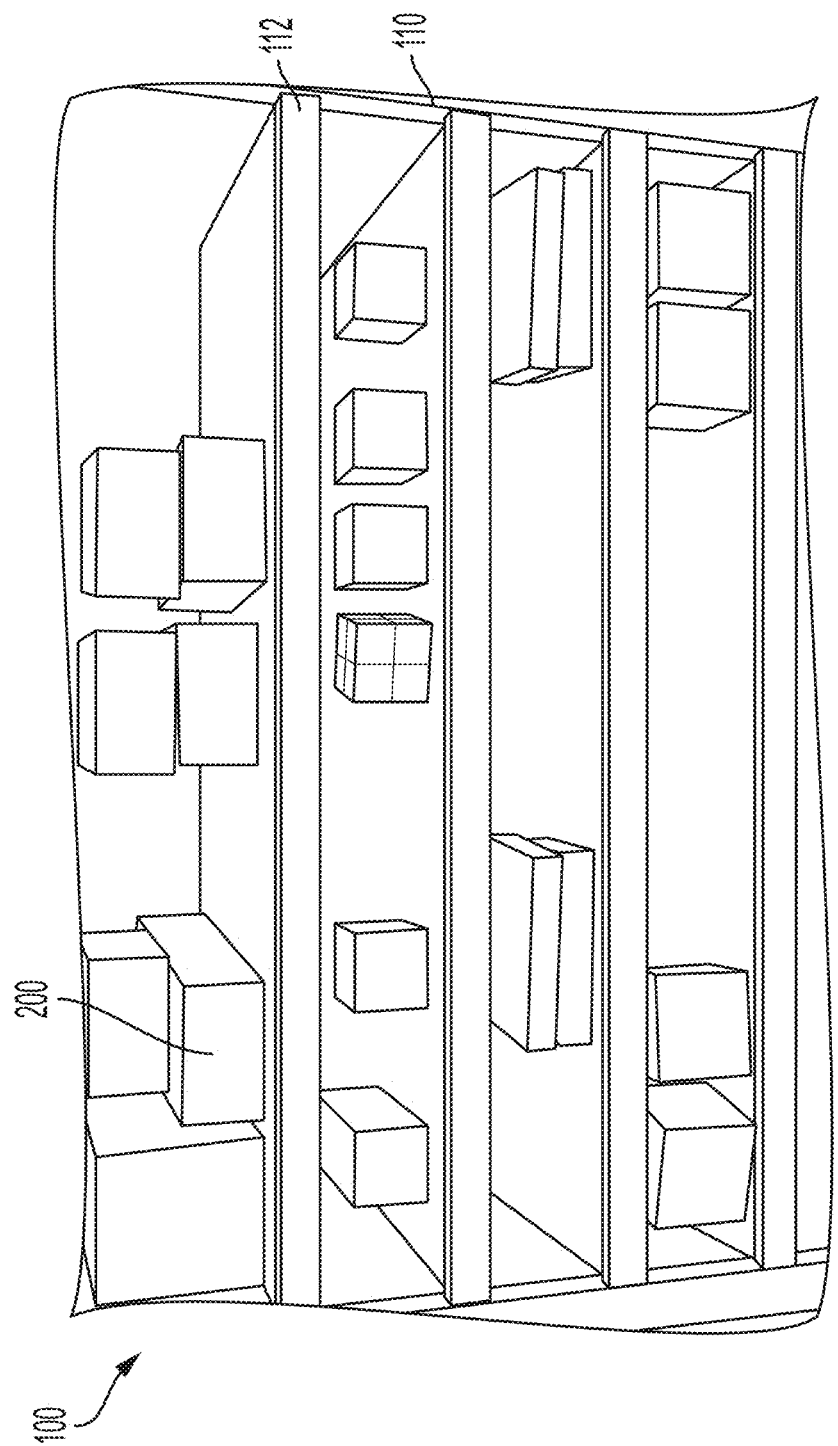
FIG. 11 shows a view of products in a shelf as determined by an optical sensor according to an embodiment.

In some embodiments, an optical sensor 160 may be used to determine a visual characteristic and/or a location of a product (see, e.g., FIG. 1). Optical sensor 160 may be arranged within cabinet 110 and may view substantially an entire of interior of cabinet. Optical sensor 160 may use different optical wavelengths. In some embodiments, optical sensor 160 may be used to aid in determination of the location, size, and shape of each object in cabinet 110, as shown for example in FIG. 11. Data from optical sensors may determine the size, shape and location of products that may be obscured from the view of cameras. Further, if a consumer removes and returns a product to a different location, optical sensor can determine the location of the product.

In some embodiments, optical sensor may be an RFID sensor. In such embodiments, cabinet 110 may include an RFID sensor configured to detect the presence of RFID tagged products. Thus, when a product is removed from cabinet, RFID sensor may determine the identity of the product removed. In some embodiments, optical sensor may be a light detection and ranging (LIDAR) sensor or a magnetic resonance imaging (MRI) sensor, among others. Data from optical sensor 160 may be used to confirm the identity of the product removed from the cabinet as determined by other sensors or cameras. This may help to increase the accuracy of the product identification.

Figure 12:
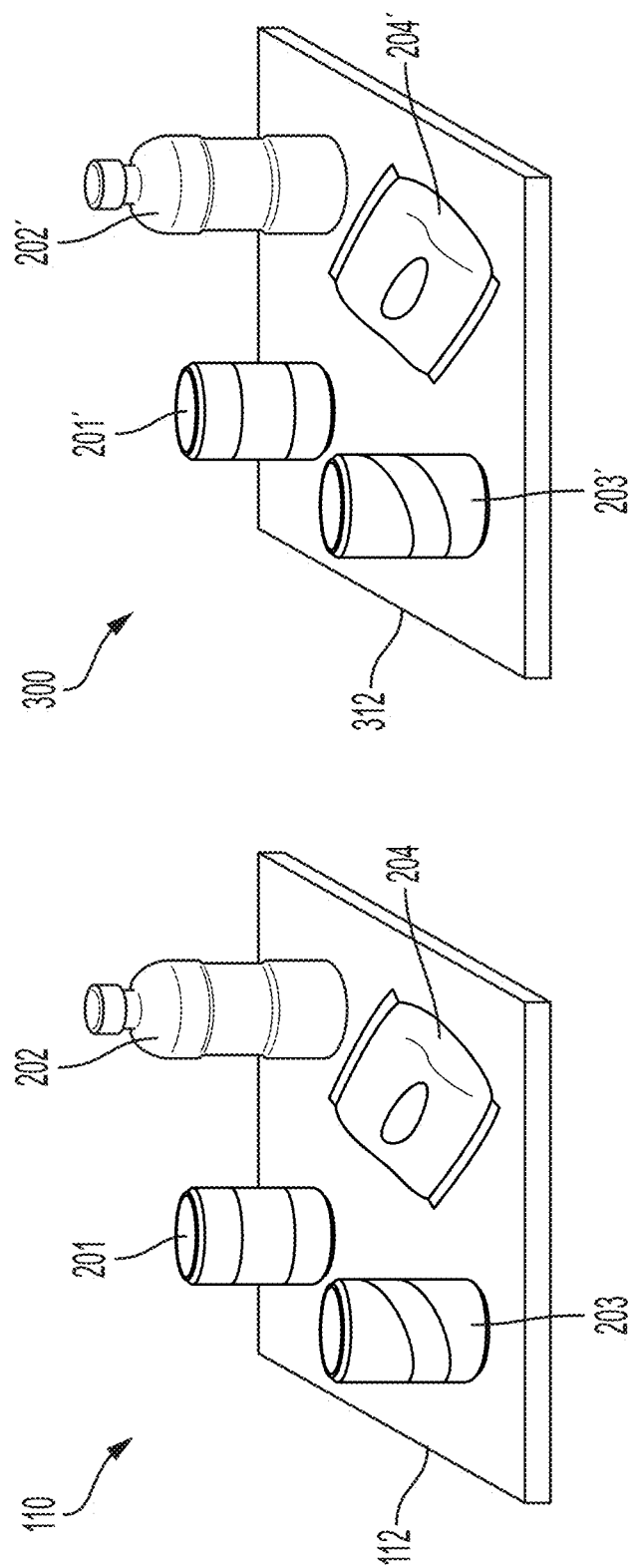
FIG. 12 shows a perspective view of a cabinet of a vending machine and a digital map of the products according to an embodiment.

In some embodiments, vending machine may generate a digital map of products in cabinet, as shown in FIG. 12. Digital map 300 may include a digital representation of cabinet and products therein. Thus, digital map 300 may be a real-time, digital twin of cabinet 110 and products in cabinet 110. For example, as shown in FIG. 12, a shelf 112 of cabinet 110 may include products 201-204 arranged on shelf 112 in specific locations. Digital map 300 may include a representation of cabinet and shelf 312, and may include models, such as 3D models of products 201'-204' on shelf 312. Thus, digital map 300 may include the location and identity of products in cabinet 110 of vending machine 100. Digital map 300 may also serve as a product inventory so that the number of each product in the cabinet is known.

In some embodiments, cameras 120, sensors, or a combination thereof may be used to generate digital map 300. For example, as an operator places each product in cabinet 110, cameras 120 and sensors detect the location and identity of the product, and may further generate a 3D model of the product. In this way, the digital map may be generated as the cabinet 110 is filled. In some embodiments, an operator can manually input or confirm the identity and location of each product within the cabinet.

Digital map 300 may provide a baseline of information about products in the cabinet before a consumer accesses the cabinet. If a consumer removes a product from a particular location within cabinet, the identity of the product at that location is known from the digital map. Thus, the digital map may be used to confirm a product identification made based on data from cameras 120 or other sensors of vending machine 100. Further, as consumers remove products from the cabinet, data from cameras 120 and sensors may be used to update the digital map. For example, the digital map may be updated to reflect that one or more products have been removed, one or more products have been restocked, or may be updated to reflect that one or more products have been moved or relocated within cabinet. Optical sensor 160 may help to determine a location of products within cabinet as view of some products within cabinet may be obscured from view of cameras.

Figure 13:
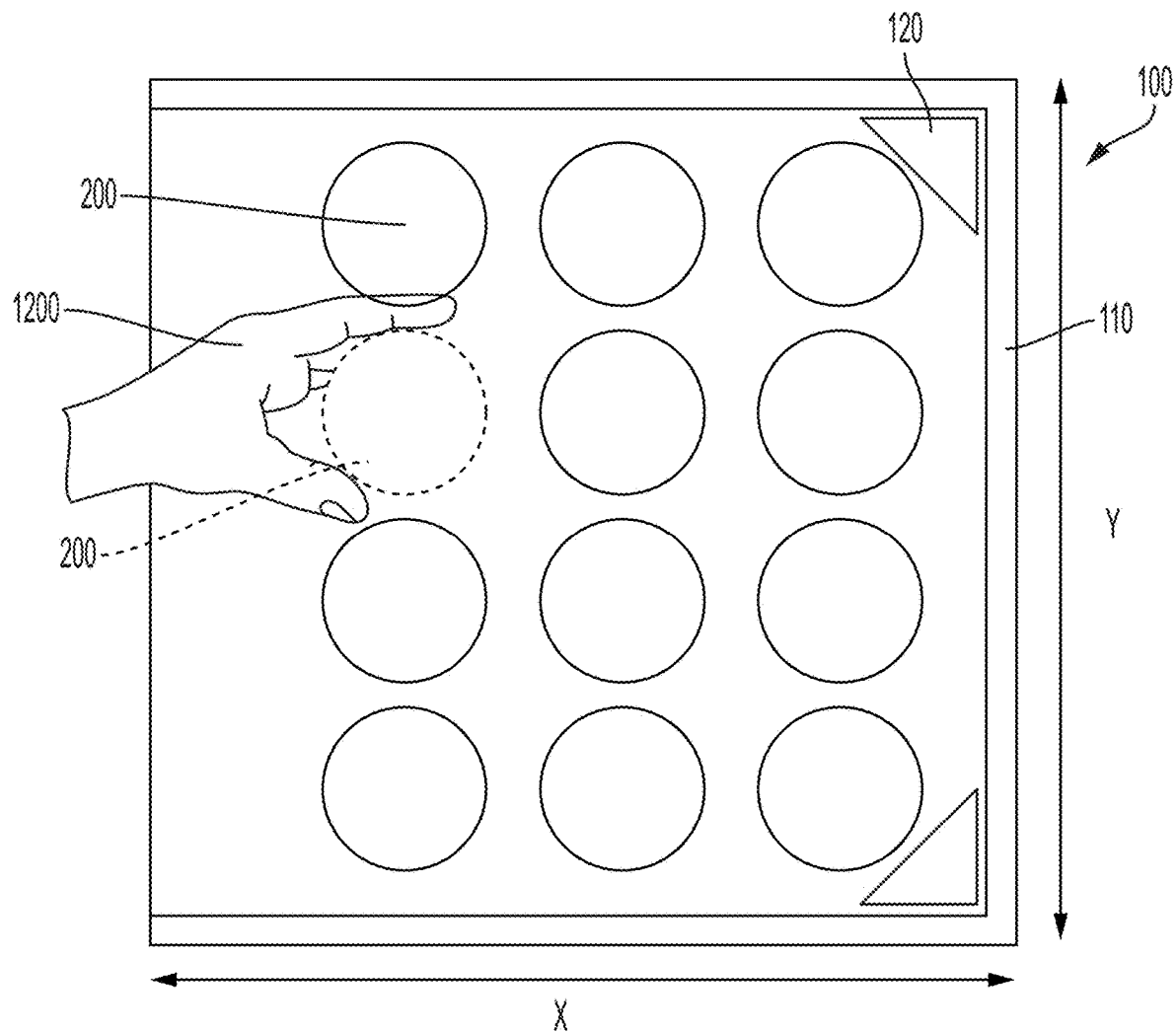
FIG. 13 shows a top-down view of a system for identifying a product by tracking a location of a consumer's hand according to an embodiment.

In some embodiments, a product identity may be determined in part by tracking a location of a consumer's hand, as shown in FIG. 13. The location of the consumer's hand may be tracked by computer-vision technology based on data from cameras 120. The coordinates of the consumer's hand 1200 within cabinet 110 may be detected by one or more cameras 120 to determine which shelf the consumer is accessing. In some embodiments, consumer's hand 1200 may be tracked to determine a product 200 at the location of the consumer's hand. The coordinates of the consumer's hand may be determined in two-dimensions, such as in a top down view of the shelf. For example, the coordinates of the consumer's hand 1200 may include a position along an X-axis that extends in a direction from a front to a rear portion of cabinet 110, and a position along a transverse axis, or Y-axis. The identity and location of each product 200 may be known, such as by the digital map. Thus, if the location of the consumer's hand is known, the product 200 at the coordinates of the consumer's hand 1200 can readily be identified by determining the product at that location in the digital map. Computer vision may further detect a particular movement or gesture by the consumer's hand 1200 to determine whether the consumer is picking up or returning a product. In some embodiments, a trajectory of the consumer's hand 1200 may be detected to determine a product selected by the consumer.

Figure 14:
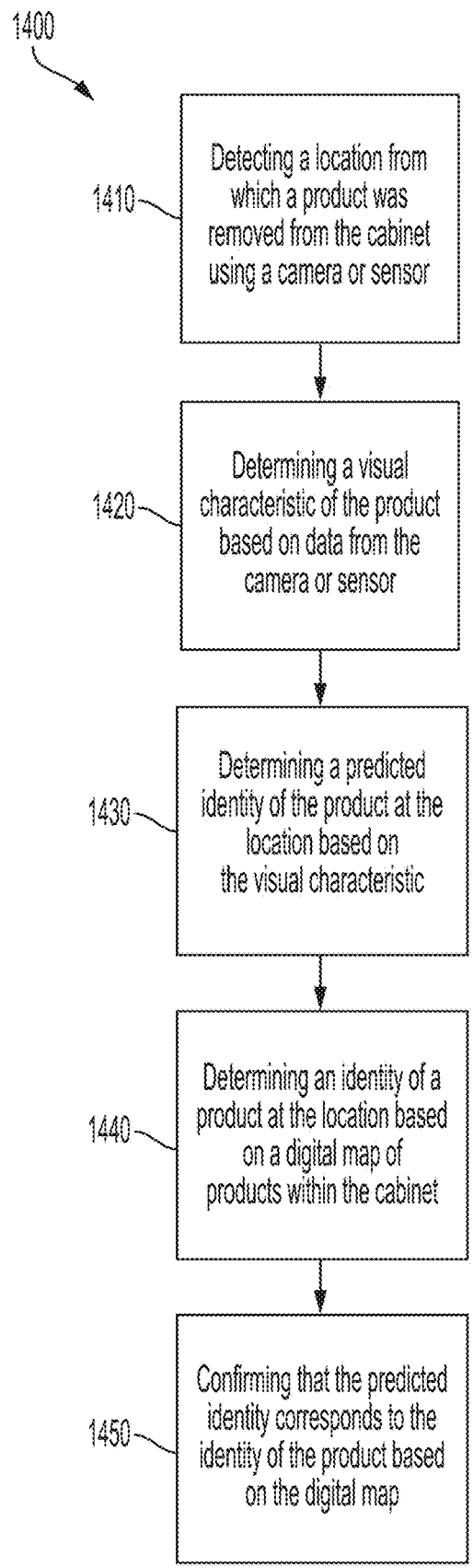
FIG. 14 shows an exemplary method of determining an identity of a product according to an embodiment.

An exemplary method of determining a product identity using a digital map 1400 is shown in FIG. 14. A location from which a product was removed from the cabinet may be detected by at least one of a camera and sensor 1410. A visual characteristic of the product removed from the cabinet may be determined based on data from the camera or sensor 1420. A predicted identity of the product at the location may be determined based on the visual characteristic 1430. For example, artificial intelligence and machine learning technology may be used to predict an identity of the product based on a pre-trained machine learning model. For example, the visual characteristic may be a shape of the product, and the artificial intelligence may analyze products in the product inventory having known shapes that best match the shape of the product. In order to confirm that the predicted identity is correct, an identity of the product at the location may be determined based on a digital map of products within the cabinet 1440. The predicted identity may be confirmed if the predicted identity corresponds to the identity of the product based on the digital map 1450.

In some embodiments, vending machine 100 may include an external camera 130, as shown in FIG. 1. External camera 130 may be configured to view an area external to vending machine 100. External camera 130 may be positioned outside of cabinet 110, or may be arranged within cabinet 110 so as to view an area external to vending machine 100. For example, external camera 130 may be arranged on a door of vending machine 100, on an exterior of cabinet 110, or camera 130 may be separate from vending machine 100. In some embodiments, external camera 130 may be activated when a presence of a consumer is detected near the vending machine 100. Presence of a consumer may be detected by a proximity sensor 135 (see, e.g., FIG. 2).

External camera 130 may be configured to capture an image or video of one or more consumers, and/or an image or video of a product removed from cabinet 110. In some embodiments, external camera 130 may be configured to identify one or more consumers. Captured images or video may be used for facial recognition of consumers. In some embodiments, external camera 130 may be configured to identify a hand of a consumer and movements thereof.

External camera 130 may capture images or videos that may be analyzed to determine a visual characteristic of a product removed from cabinet 110, similar to the operation of internal cameras 120. Thus, a product removed from cabinet 110 may be detected by external cameras 130 to determine a shape, size, or coloring of the product. Data from external camera 130 may be used to confirm the identity of a product removed from cabinet 110 as determined by other cameras or sensors described herein.

In some embodiments, external cameras 130 may also be used to determine whether a consumer is engaging in an unauthorized activity. In some embodiments, external camera 130 may be monitored remotely by an operator, such as security personnel. In some embodiments, data from external camera 130 may be analyzed by artificial intelligence that is pre-trained to detect unauthorized activities. Artificial intelligence may detect gestures or movements of a consumer, or the consumer's hands. For example, artificial intelligence may be programmed to detect a consumer striking the vending machine 100, or blocking a camera 120 to inhibit product identification, among other activities. If unauthorized activities are detected, authorities, such as a security personnel or local authorities may be alerted. Further, a door of the cabinet may be locked so door cannot be opened and products within cabinet can no longer be accessed by the consumer. In some embodiments, an alarm 178 may be activated if unauthorized activity is detected (see, e.g., FIG. 2).

In some embodiments, the identity of a product removed from cabinet may be determined using one or more of internal cameras 120, weight sensors 140, optical sensors 160, identifier sensor 150, or external cameras 130 as described herein. While the identity of a product removed from cabinet 110 may be determined based on data from internal cameras 120 and identifier sensor 150, one or more of an optical sensor 160, weight sensor 140, and external camera 130 may be used to confirm that the identity is correct. The additional sensors or cameras may also serve as a back-up in the event that a camera or identifier fails to operate correctly.

In one example of a product identification, a camera may capture an image of the product to identify the shape of a product (e.g., a bottle-shape). However, the shape of the product may correspond to multiple possible product identities (e.g., Pepsi, diet Pepsi, or cherry Pepsi). An identifier sensor may detect an identifier on the product, such as text (e.g., diet Pepsi), which may correspond to multiple product identities (e.g., a can or a bottle). Thus, in combination, the data from the camera and identifier sensor may be analyzed to determine a predicted identity of the product (e.g., a bottle of diet Pepsi). The analysis may limit potential product identifications to products in the product inventory. Additional data may be collected to confirm that the product identification is correct. For example, a weight sensor may determine a calculated weight of the product, and the calculated weight may correspond to a bottle of diet Pepsi, confirming the product identification. An optical sensor may indicate that the product was removed from a location in the cabinet at which a bottle of diet Pepsi was stored. Further, an external camera may detect a visual characteristic, such as the bottle shape once the product is removed from the cabinet. Thus, the additional cameras and sensors may help to confirm that a product has been correctly identified.

In another example, an internal camera may capture images before and after a consumer removes a product from the cabinet. The images may be analyzed to determine a location in the cabinet from which the product was removed. The data from the camera indicating the location of the product may be analyzed using a digital map of products in the cabinet to determine the identity of the product at that location. To confirm the identity of the product, a camera that detects products entering or exiting the cabinet may determine a visual characteristic of the product removed from the cabinet to confirm the identity of the product determination based on the digital map. Alternatively, an identifier sensor may detect an identifier of the product removed from the cabinet.

In some embodiments, artificial intelligence may determine a confidence level for product identification based on the cameras or sensors. Sensor fusion algorithms may determine the product identity based on the confidence level in the identification made by each camera or sensor. If the data is in agreement, the product identity is confirmed. For example, if a first camera determines a product removed is Product A with 80% confidence, a second camera determines the product removed is Product B with 30% confidence, the algorithm may determine that Product A is the correct product identification due to the higher confidence level. In some embodiments, data from a particular camera or sensor may have a stronger weight in determining the identity. In some embodiments, if the confidence level is below a predetermined threshold, e.g., 30%, the data may be disregarded. In some embodiments, if the confidence level is below a predetermined threshold, an alert may be sent for an audit or review to be conducted.

Figure 15:
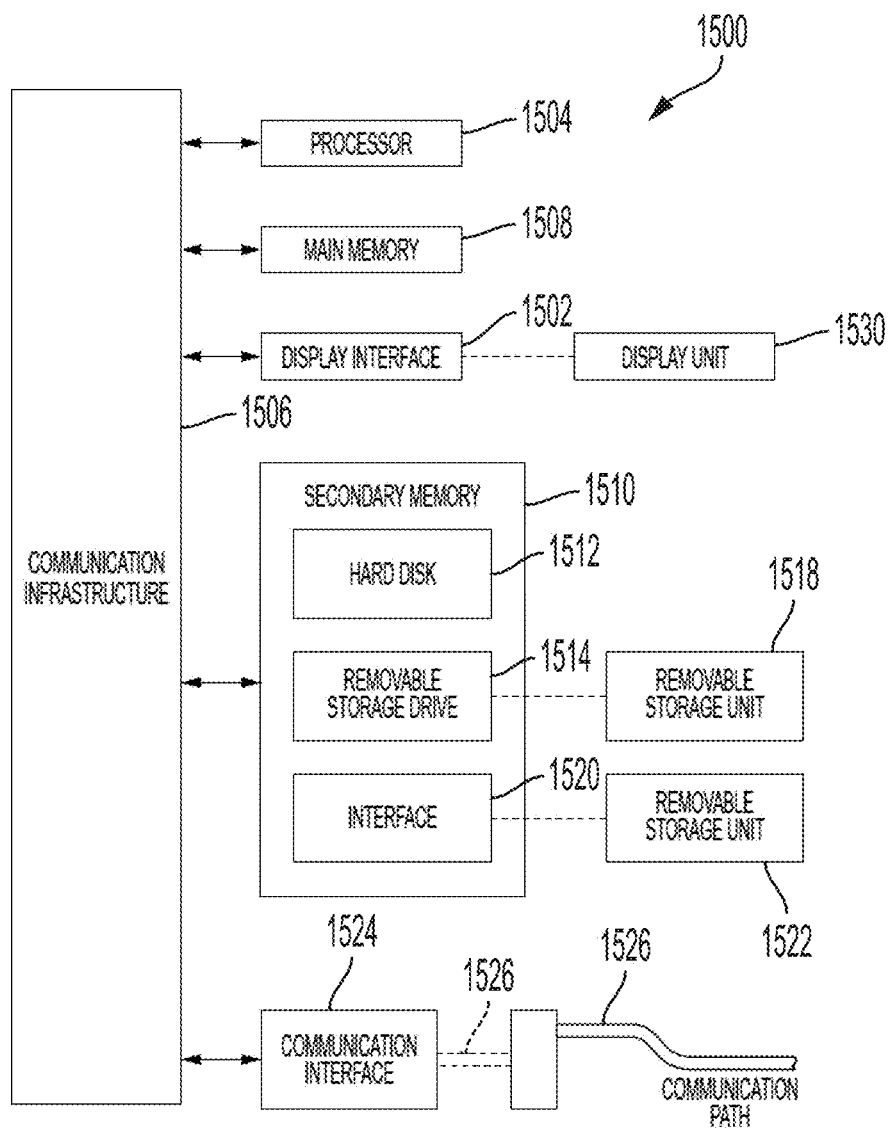
FIG. 15 shows a schematic block diagram of an exemplary computer system in which embodiments may be implemented.

FIG. 15 illustrates an exemplary computer system 1500 in which embodiments, or portions thereof, may be implemented as computer-readable code. Control unit 180 as discussed herein may be computer systems having all or some of the components of computer system 1500 for implementing processes discussed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, and mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention(s) may be implemented in terms of this example computer system 1500. After reading this description, it will become apparent to a person skilled in the relevant art how to implement one or more of the invention(s) using other computer systems and/or computer architectures. Although operations may be described as a sequential process, some of the operations may in fact be performed in parallel, concurrently, and/or in a distributed environment, and with program code stored locally or remotely for access by single or multi-processor machines. In some embodiments, edge computing, cloud computing, or a combination thereof may be used. In addition, in some embodiments the order of operations may be rearranged without departing from the spirit of the disclosed subject matter.

Processor device 1504 may be a special purpose or a general purpose processor device. As will be appreciated by persons skilled in the relevant art, processor device 1504 may also be a single processor in a multi-core/multiprocessor system, such system operating alone, or in a cluster of computing devices operating in a cluster or server farm. Processor device 1504 is connected to a communication infrastructure 1506, for example, a bus, message queue, network, or multi-core message-passing scheme.

Computer system 1500 also includes a main memory 1508, for example, random access memory (RAM), and may also include a secondary memory 1510. Secondary memory 1510 may include, for example, a hard disk drive 1512, or removable storage drive 1514. Removable storage drive 1514 may include a floppy disk drive, a magnetic tape drive, an optical disk drive, a flash memory, or the like. The removable storage drive 1514 reads from and/or writes to a removable storage unit 1518 in a well-known manner. Removable storage unit 1518 may include a floppy disk, magnetic tape, optical disk, a universal serial bus (USB) drive, etc. which is read by and written to by removable storage drive 1514. As will be appreciated by persons skilled in the relevant art, removable storage unit 1518 includes a computer usable storage medium having stored therein computer software and/or data.

Computer system 1500 (optionally) includes a display interface 1502 (which can include input and output devices such as keyboards, mice, etc.) that forwards graphics, text, and other data from communication infrastructure 1506 (or from a frame buffer not shown) for display on display unit 1530.

In alternative implementations, secondary memory 1510 may include other similar means for allowing computer programs or other instructions to be loaded into computer system 1500. Such means may include, for example, a removable storage unit 1522 and an interface 1520. Examples of such means may include a program cartridge and cartridge interface (such as that found in video game devices), a removable memory chip (such as an EPROM, or PROM) and associated socket, and other removable storage units 1522 and interfaces 1520 which allow software and data to be transferred from the removable storage unit 1522 to computer system 1500.

Computer system 1500 may also include a communication interface 1524. Communication interface 1524 allows software and data to be transferred between computer system 1500 and external devices. Communication interface 1524 may include a modem, a network interface (such as an Ethernet card), a communication port, a PCMCIA slot and card, or the like. Software and data transferred via communication interface 1524 may be in the form of signals, which may be electronic, electromagnetic, optical, or other signals capable of being received by communication interface 1524. These signals may be provided to communication interface 1524 via a communication path 1526. Communication path 1526 carries signals and may be implemented using wire or cable, fiber optics, a phone line, a cellular phone link, an RF link or other communication channels.

In this document, the terms "computer program medium" and "computer usable medium" are used to generally refer to media such as removable storage unit 1518, removable storage unit 1522, and a hard disk installed in hard disk drive 1512. Computer program medium and computer usable medium may also refer to memories, such as main memory 1508 and secondary memory 1510, which may be memory semiconductors (e.g. DRAMs, etc.).

Computer programs (also called computer control logic) are stored in main memory 1508 and/or secondary memory 1510. Computer programs may also be received via communication interface 1524. Such computer programs, when executed, enable computer system 1500 to implement the embodiments as discussed herein. In particular, the computer programs, when executed, enable processor device 1504 to implement the processes of the embodiments discussed here. Accordingly, such computer programs represent controllers of the computer system 1500. Where the embodiments are implemented using software, the software may be stored in a computer program product and loaded into computer system 1500 using removable storage drive 1514, interface 1520, and hard disk drive 1512, or communication interface 1524.

Embodiments of the invention(s) also may be directed to computer program products comprising software stored on any computer useable medium. Such software, when executed in one or more data processing device, causes a data processing device(s) to operate as described herein. Embodiments of the invention(s) may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A method for identifying a product removed from a cabinet, comprising:
   storing the product in a product storage area of a cabinet, wherein the product storage area is accessible to a consumer via a door to allow for the consumer to select the product to be purchased;
   detecting visual characteristics of the product removed from the cabinet by a camera within the cabinet when the door of the cabinet is opened;
   detecting an identifier on the product removed from the cabinet by an identifier sensor;
   comparing the visual characteristics and the identifier to a database of product information; and
   identifying the product removed from the cabinet based on the comparison of the visual characteristics and the identifier to the database of product information.

2. The method of claim 1, wherein the visual characteristics comprises a shape of the product.

3. The method of claim 1, wherein the visual characteristics comprises a coloring of the product.

4. The method of claim 1, wherein the identifier sensor is the camera.

5. The method of claim 1, wherein the identifier is a barcode.

6. The method of claim 1, further comprising:
   confirming the identity of the product by determining a weight of the product removed from the cabinet with a weight sensor arranged within the cabinet.

7. The method of claim 6, wherein determining the weight of the product removed from the cabinet comprises:
   determining a first weight of products in the cabinet via the weight sensor;
   determining a second weight of products in the cabinet via the weight sensor after removing the product from the cabinet; and
   calculating a difference between the first weight and the second weight.

8. The method of claim 1, further comprising:
   detecting a visual characteristic of the product removed from the cabinet at a location outside of the cabinet by an external camera; and
   confirming the identity of the product removed based on the visual characteristic detected by the external camera.

9. The method of claim 1, further comprising:
   detecting the consumer by an external camera;
   detecting by the external camera unauthorized conduct by the consumer; and
   locking the cabinet when the unauthorized conduct is detected.

10. The method of claim 1, further comprising:
    detecting data relating to the product removed via an optical sensor; and
    confirming the identity of the product removed using the data from the optical sensor.

11. The method of claim 1, wherein the camera is one of a plurality of cameras arranged at a perimeter of a front portion of the cabinet.

12. A method for identifying a product removed from a cabinet, comprising:
    storing a plurality of products within a cabinet, wherein the cabinet comprises a door that is openable by a consumer to access the plurality of products;
    capturing a first image of the plurality of products within the cabinet by an internal camera within the cabinet prior to the consumer accessing the cabinet;
    capturing a second image of the plurality of products within the cabinet by the internal camera after the consumer accesses the cabinet;
    determining an identity of a product removed from the cabinet by analyzing the first image and the second image; and
    confirming the identity of the product removed from the cabinet by detecting an identifier of the product removed from the cabinet.

13. The method of claim 12, further comprising:
    confirming the identity of the product by detecting a weight of the product removed from the cabinet via a weight sensor.

14. The method of claim 12, further comprising:
    detecting a visual characteristic of the product removed from the cabinet at a location outside of the cabinet by an external camera; and
    confirming the identity of the product removed based on the visual characteristic detected by the external camera.

15. The method of claim 12, further comprising:
    detecting data relating to the product removed via an optical sensor; and
    confirming the identity of the product removed using the data from the optical sensor.

16. The method of claim 15, wherein the optical sensor comprises a LIDAR sensor.

17. A method for identifying a product removed from a cabinet, comprising:
    detecting a location from which the product was removed from the cabinet via at least one of a camera and a sensor;
    determining a visual characteristic of the product based on data from the at least one of a camera and a sensor;
    determining a predicted identity of the product based on the visual characteristic;
    determining an identity of the product at the location based on a digital map of products within the cabinet, wherein the digital map is generated using data received from the at least one of a camera and a sensor, and wherein the digital map comprises a location and identity of each product within the cabinet; and
    confirming that the predicted identity of the product corresponds to the identity of the product based on the digital map.

18. The method of claim 17, further comprising:
  updating the digital map of products within the cabinet after the product is removed from the cabinet.

19. The method of claim 17, further comprising detecting an identifier of the product removed from the cabinet via an identifier sensor.

* * * * *